Figure 1:
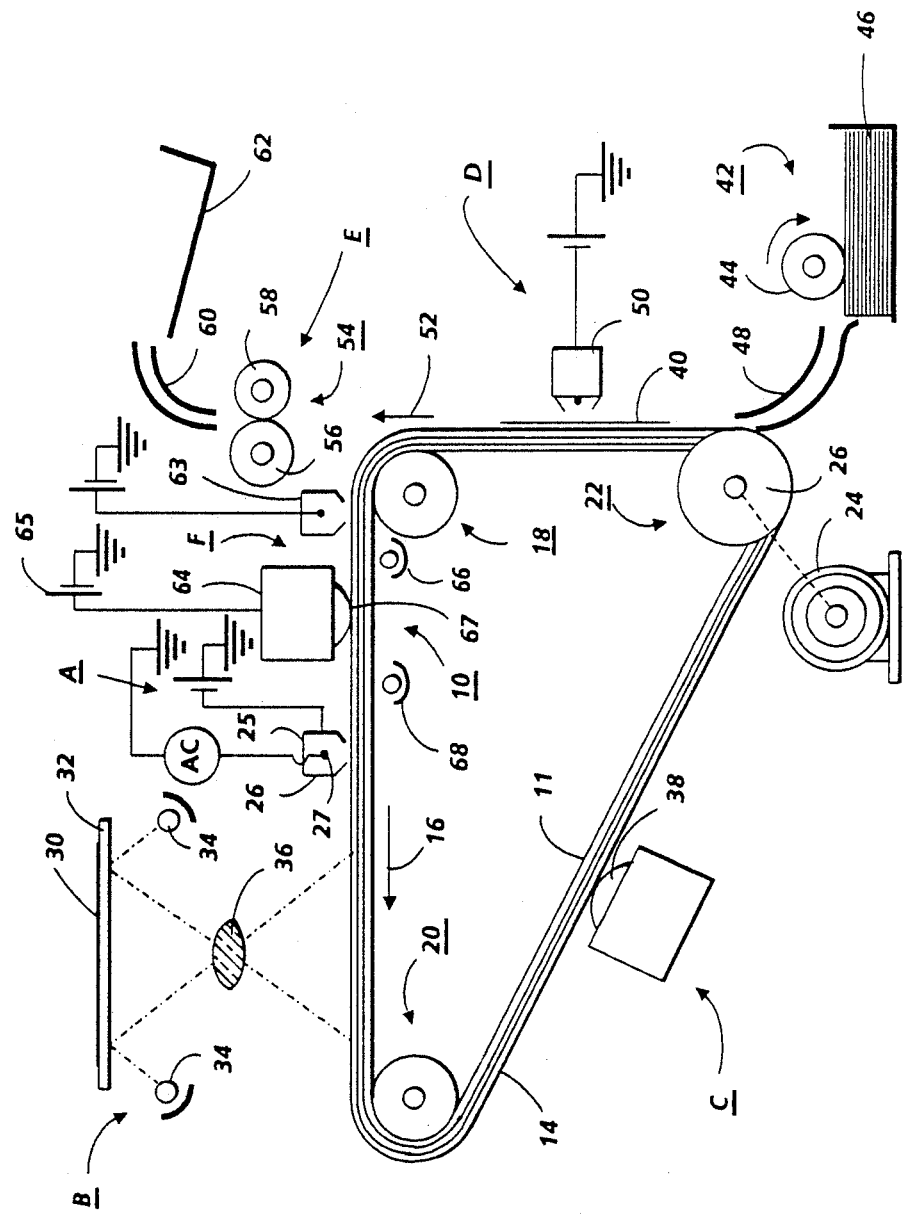

United States Patent [19]

Mueller

[11] Patent Number: 4,804,999
[45] Date of Patent: Feb. 14, 1989

[54] MAG BRUSH CLEANER ERASE LIGHT

[75] Inventor: Karl J. Mueller, Fairport, N.Y.

[73] Assignee: Xerox Corporation, Stamford, Conn.

[21] Appl. No.: 109,127

[22] Filed: Oct. 16, 1987

[51] Int. Cl.⁴ ............................................. G03G 15/08
[52] U.S. Cl. ...................................... 355/15; 355/3 R; 355/3 DD
[58] Field of Search ................... 355/15, 3 DD, 14 D, 355/3 R

[56] References Cited

U.S. PATENT DOCUMENTS

| | | | |
|---|---|---|---|
| 3,828,921 | 10/1974 | Sargis | 355/15 |
| 4,201,465 | 5/1980 | Oyama et al. | 355/15 |
| 4,205,912 | 6/1980 | Yamaguchi et al. | 355/15 |
| 4,623,243 | 11/1986 | Iijima et al. | 355/15 |

FOREIGN PATENT DOCUMENTS 3812993 8/1985 Japan .

Primary Examiner—A. C. Prescott
Attorney, Agent, or Firm—Ronald F. Chapuran

[57] ABSTRACT

A cleaning system in which the cleaning nip region is kept dark and light is projected between the preclean corotron and the nip of the magnetic cleaning brush and also light is projected at the exit of the cleaning nip region prior to the charge corotron. Cleaning occurs at the entrance of the nip, and as the photoreceptor moves through the cleaner nip, it is charged in the direction that the cleaning roll is biased. This reduces the electrostatic field at the exit of the cleaning nip and, in turn, minimizes the redeposition of wrong sign toner onto the photoreceptor as well as reducing field driven bead loss.

5 Claims, 2 Drawing Sheets

MAG BRUSH CLEANER ERASE LIGHT

BACKGROUND OF THE INVENTION

This invention relates generally to electrostatic reproduction apparatus and in particular to the removal of the residual toner particles from a photoconductive element after a transfer operation.

In order to remove residual toner from a photoconductive surface, it is usually necessary to dissipate the electrostatic image on the drum which strongly binds the residual toner to the drum surface. For this reason a corona discharge unit is often used to apply an electric field opposite in polarity to the initial electrostatic charge to neutralize the electrostatic image on the drum, and to use a light source to subsequently illuminate the drum surface to cause further discharge of the drum. For example, Japanese publication 38-12993 shows illumination from behind the photoreceptor over the entire area of image transfer and cleaning to discharge the photoreceptor and to facilitate both transfer and cleaning. U.S. Pat. No. 3,838,921 shows illumination both behind and in front of a photoreceptor belt to discharge the belt and facilitate cleaning when the system is on a cleaning cycle. U.S. Pat. No. 4,201,465 discloses illumination between the preclean corona and the cleaning station when the system is on a cleaning revolution. U.S. Pat. No. 4,205,912 shows an illumination source to discharge the photoreceptor prior to cleaning during a cleaning revolution, and also shows an illumination source just after the cleaning station to condition the photoreceptor prior to charging for the next exposure.

A difficulty with the above described systems is that they are either used in a two-cycle xerographic system and are not adapted to one cycle system operation. It is also known to discharge the photoreceptor via light after the preclean station in order that the voltage variation of the photoreceptor entering the cleaner can be minimized. Since cleaning is primarily a field driven process with certain types of cleaners, control of the incoming photoreceptor potential enhances cleaning latitude. With light at the cleaning nip region, the charge is eliminated from the photoreceptor, and the toner tends to be attracted to the negatively charged magnetic brush, after a positive charge from the preclean corotron changes the negative charged toner to a positive charge. A difficulty with this type of system is that an electrostatic field remains at the exit of the cleaning nip and there is a tendency for the redeposition of toner onto the surface of the photoreceptor from the cleaning brush. A difficulty with the above systems, also, is that there is still an appreciable amount of degradation of the belt and a buildup of toner on the belt as well as bead loss from the magnetic brush causing spots on the copies.

It is an object of the present invention, therefore, to provide a new and improved single cycle cleaning system that provides less degradation of the belt and a less likely buildup of toner on the belt and bead loss from the magnetic brush. It is another object of the present invention to broaden the redeposition failure limit resulting in improved cleaning latitude.

Further advantages of the present invention will become apparent as the following description proceeds and the features characterizing the invention will be pointed out with particularity in the claims annexed to and forming a part of this specification.

Briefly, the present invention is a cleaning system in which the cleaning nip region is kept dark and light is projected between the preclean corotron and the nip of the magnetic cleaning brush and also light is projected at the exit of the cleaning nip region prior to the charge corotron. Cleaning occurs at the entrance of the nip, and as the photoreceptor moves through the cleaner nip, it is charged in the direction that the cleaning roll is biased. This reduces the electrostatic field at the exit of the cleaning nip and, in turn, minimizes the redeposition of wrong sign toner onto the photoreceptor as well as reducing field driven bead loss, that is the difference in voltage between the mag brush cleaner and the photorecptor.

Figure 2:
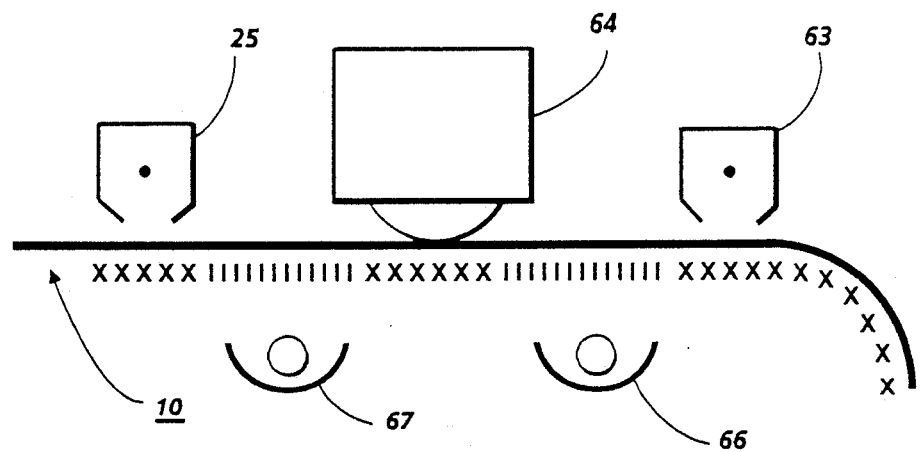

For a better understanding of the present invention, reference may be had to the accompanying drawings wherein the same reference numerals have been applied to like parts and wherein:

FIG. 1 is an elevational view of a reproduction machine incorporating the present invention; and FIG. 2 is a more detailed illustration of the cleaning station in accordance with the present invention.

Inasmuch as the art of electrophotographic printing is well known, the various processing stations employed in the printing machine illustrated in FIG. 1 will be described only briefly.

As shown in FIG. 1, the printing machine utilizes a photoconductive belt 10 which consists of an electrically conductive substrate 11 supporting a suitable photoconductive surface 14. Belt 10 moves in the direction of arrow 16 to advance successive portions thereof sequentially through the various processing stations disposed about the path of movement thereof.

Belt 10 is entrained about stripping roller 18, tension roller 20 and drive roller 22. Roller 22 is coupled to motor 24 by suitable means such as a drive chain. Belt 10 is maintained in tension by a pair of springs (not shown) resiliently urging tension roller 20 against belt 10 with the desired spring force. Both stripping roller 18 and tension roller 20 are rotatably mounted. These rollers are idlers which rotate freely as belt 10 moves in the direction of arrow 16.

With continued reference to FIG. 1, initially a portion of belt 10 passes through charging station A. At charging station A, a corona device, indicated generally by the reference numeral 25, charges surface 14 of belt 10 to a relatively high, substantially uniform negative potential. A suitable corona generating device for negatively charging the photoreceptor belt 10 comprises a conductive shield 26 and corona wire 27. Application of a suitable d.c. bias on the conductive shield 26 will result in a suitable charge being applied to the photoreceptor belt as it is advance through exposure station B. At exposure station B, an original document 30 is positioned face down upon a transparent platen 32. The light rays from lamps 34 reflected from original document 30 form images which re transmitted through lens 36. The light images are projected onto the charged portion of the photorecptor belt to selectively dissipate the charge thereon. This records an electrostatic latent image on the belt which corresponds to the informational area contained within original document 30.

Thereafter, belt 10 advances the electrostatic latent image to development station C. At development station C, a magnetic brush developer roller 38 advances a developer mix (i.e. toner and carrier granules) into contact with the electrostatic latent image. The latent image attracts the toner particles from the carrier granules thereby forming toner powder images on the photoreceptor belt.

Belt 10 then advances the toner powder image to transfer station D. At transfer D, a sheet of support material 40 is moved into contact with the toner powder images. The sheet of support material is advanced to transfer station D by a sheet feeding apparatus 42. Preferably, sheet feeding apparatus 42 includes a feed roll 44 contacting the upper sheet of stack 46. Feed roll 44 rotates so as to advance the upper most sheet from stack 46 into chute 48. Chute 48 directs the advancing sheet of support material into contact with the belt 10 in a timed sequence so that the toner powder image developed thereon contacts the advancing sheet of support material at transfer station D.

Transfer station D includes a corona generating device 50 which sprays ions of a suitable polarity onto the backside of sheet 40 so that the toner powder images are attracted from photoconductive belt 10 to sheet 40. After transfer, the sheet continues to move in the direction of arrow 52 onto a conveyor (not shown) which advances the sheet to fusing station E.

Fusing station E includes a fuser assembly, indicated generally by the reference numeral 54, which permanently affixes the transferred toner powder images to sheet 40. Preferably, fuser assembly 54 includes a heated fuser roll 56 adapted to be pressure engaged with a back-up roller 58 with the toner powder images contacting fuser roller 56. In this manner, the toner powder image is permanently affixed to sheet 40. After fusing, chute 60 guides the advancing sheet 40 to catch tray 62 for removal from the printing machine by the operator.

A preclean dicorotron 63 is provided for exposing the residual toner and contaminantes to positive charges to thereby narrow the charge distribution thereon so that a negatively biased cleaning roller, to be discussed hereinafter, will be more effective in removing them.

At a cleaning station F, residual toner is removed from the photoreceptor surface by means of a captive magnetic brush 64 which is negatively biased by means of a power source 65 and rotated in the via a not shown motor. In a xerographic system of the type disclosed herein, the brush 64 will remove toner having a positive charge.

In accordance with the present invention, a source of illumination, such as a lamp shown generally at 66, or any other suitable illuminator, is positioned along the belt 10 intermediate the preclean dicorotron 63 and the magnetic brush 64. By discharging the photoreceptor surface with light after exposure of the residual toner to positive charges to narrow the charge distribution, the voltage variation of the photorecepter surface entering the cleaner station can be minimized. That is, the preclean dicorotron 63 charges the toner positive and the lamp 66 takes the charge off the photoreceptor surface (eliminates the field from the belt 10). This enables the positively charged toner to be attracted to the negatively biased mag brush 64. In addition, as shown lamp 68 discharges the belt 10 between the nip 67 and the charging corona device 25.

Since cleaning is primarily a field driven process with a magnetic brush cleaner, control of the incoming photoreceptor potential enhances cleaning latitude. In the configuration with the illumination by the lamp 66 prior to the nip 67 of the magnetic brush 64, the cleaning nip region remains dark. The variation of the photoreceptor field or electric potential is minimized as the photoreceptor enters the cleaning region. However, since cleaning occurs at the entrance of the nip 67, the cleaning function or scavenging the toner is not altered from the prior art situation of the illumination occurring directly at the nip.

In operation, as the photoreceptor surface moves through the cleaning nip 67, it is charged in the direction that the magnetic brush is biased, This reduces the electrostatic field at the exit of the cleaning nip which, in turn, minimizes the redeposition of wrong sign toner onto the photoreceptor surface. That is, in the prior art, there often was the problem of negatively charged toner being repelled by the mag brush back to the photoreceptor surface. In addition, the field driven bead loss will be reduced, that is, the difference in voltage between the belt 10 and the magnetic brush 66.

Thus, with illumination prior to the nip 67, the cleaning scavenging boundary will broaden the limit of redeposition of negative toner resulting in improved cleaning latitude. It should also be noted that the system as described is a positive toner charging system, but that the same principles would apply to a negative toner charging system.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. In a single cycle copying machine comprising:
   a source of copy material,
   a recording member having a photoconductive surface,
   charging means for electrically charging the photoconductive surface of said recording member,
   exposure means for selectively discharging said photoconductive surface to provide a charged image of an original thereon,
   developing means for applying toner to said member whereby said toner is electrostatically attracted to said charged image,
   transfer means for transferring said developed image to said copy material,
   means for freeing toner from said recording member to prevent copies made subsequently from other originals from receiving toner remaining on said recording member after said developed image has been transferred to said copy material, said means for freeing making contact with the photoconductive surface,
   a first illuminating source positioned adjacent the recording member and operable to illuminate a portion of the photoconductive surface of said recording member prior to said surface making contact with the means for freeing to destroy said charged image and the electrostatic attractive force thereof securing the toner thereto and
   a second illuminating source for radiating light onto the photoconductive surface after removal of toner by said means for freeing toner.

2. The copying machine of claim 1 wherein the first illuminating source is disposed up stream of said means for freeing, the portion of the photoconductive surface disposed at the means for freeing being unaffected by the light rays of said illuminating means.

3. The copying machine of claim 2 wherein the means for freeing is a magnetic brush forming a nip with the photoconductive surface.

4. In an electrophotographic process in which a photoconductive member is electrostatically charged, radiated with a light image to produce an electrostatic image, developed by application of a toner substance thereto to form a toner image and subjected to a transfer operation in which the toner image is transferred to a copy sheet, an improvement for removing residual toner substance from the photoconductive member by a cleaner at a cleaning station after the transfer operation comprising the steps of:

radiating light uniformly onto the photoconductive member prior to the cleaning station, applying an electric field to the photoconductive member to substantially neutralize the electrostatic charge, arresting the radiation of light at the cleaning station, subsequently removing the residual toner substance from the photoconductive member and radiating light onto the photoconductive member after the removal of residual toner.

5. In a single cycle copying machine comprising:
a source of copy material,
a recording member having a photoconductive surface,
charging means for electrically charging the photoconductive surface of said recording member,
exposure means for selectively discharging said photoconductive surface to provide a charged image of an original thereon,
developing means for applying toner to said member whereby said toner is electrostatically attracted to said charged image,
transfer means for transferring said developed image to said copy material,
a magnetic brush forming a nip with the photoconductive surface to prevent copies made subsequently from other originals from receiving toner remaining on said recording member after said developed image has been transferred to said copy material,
an illuminating source positioned adjacent the recording member and operable to illuminate a portion of the photoconductive surface of said recording member prior to said surface making contact with the magnetic brush to destroy said charged image and the electrostatic attractive force thereof securing the toner thereto, the portion of the photoconductive surface forming a nip with the magnetic brush remaining unilluminated and
means to illuminate the photoconductive member after the removal of residual toner.

* * * * *